(12) United States Patent
Diraison et al.

(10) Patent No.: US 7,830,123 B2
(45) Date of Patent: Nov. 9, 2010

(54) SYSTEM AND METHOD FOR OPERATING A RECHARGEABLE BATTERY HAVING A DEFECTIVE MODULE

(75) Inventors: Jean-Francois Diraison, Toulouse (FR); Jean-Marc Stephan, Auzeville Tolosane (FR)

(73) Assignee: Astrium Sas, Paris (FR)

( * ) Notice: Subject to any disclaimer, the term of this patent is extended or adjusted under 35 U.S.C. 154(b) by 775 days.

(21) Appl. No.: 11/718,163

(22) PCT Filed: Oct. 20, 2005

(86) PCT No.: PCT/FR2005/002610
§ 371 (c)(1),
(2), (4) Date: Apr. 27, 2007

(87) PCT Pub. No.: WO2006/048522
PCT Pub. Date: May 11, 2006

(65) Prior Publication Data
US 2009/0146824 A1     Jun. 11, 2009

(30) Foreign Application Priority Data
Oct. 28, 2004   (FR) .................................. 04 11534

(51) Int. Cl.
*H01M 10/44* (2006.01)
(52) U.S. Cl. .................................... 320/136
(58) Field of Classification Search ............... 320/106, 320/110, 112, 116, 118, 122, 132, 134, 136, 320/137
See application file for complete search history.

(56) References Cited

U.S. PATENT DOCUMENTS

| 4,303,877 A | 12/1981 | Meinhold |
| 6,424,158 B2 * | 7/2002 | Klang ........................ 320/165 |
| 7,132,832 B2 * | 11/2006 | Vaillancourt et al. ........ 324/426 |
| 2001/0006747 A1 | 7/2001 | Vanhee |
| 2004/0001996 A1 | 1/2004 | Sugimoto |
| 2004/0232884 A1 * | 11/2004 | Vaillancourt et al. ........ 320/132 |

FOREIGN PATENT DOCUMENTS

| EP | 0498679 | 8/1992 |
| WO | WO90/10334 | 9/1990 |

OTHER PUBLICATIONS

International Search Report for PCT/FR2005/002610, dated Oct. 18, 2006.

* cited by examiner

*Primary Examiner*—Edward Tso
(74) *Attorney, Agent, or Firm*—McDonnell Boehnen Hulbert & Berghoff LLP

(57) ABSTRACT

The invention relates to control of a battery, permitting a reduction in the number of components of the battery. The battery comprises several modules (2a, . . . , 2n), each module comprising a charge limiting circuit (4). When a module is detected as defective, the charge limiting circuit (4) carries out a command for the discharge of said defective module, by formation of a short-circuit path. The battery can subsequently be used without functional hindrance by the defective module.

22 Claims, 3 Drawing Sheets

SYSTEM AND METHOD FOR OPERATING A RECHARGEABLE BATTERY HAVING A DEFECTIVE MODULE

The present invention relates to a method of managing a rechargeable battery and a rechargeable battery suitable for implementing this method.

It relates more particularly to a method of managing a rechargeable battery comprising at least two modules of electrochemical cells connected in series, the electrochemical cells being connected in parallel to each other within each module.

Document EP 0 498 679 describes one example of managing the charge of a battery consisting of several cells connected in series. For each cell, a charge limiting circuit comprises a current bypass branch connected in parallel with that cell. When the voltage at the terminals of the cell exceeds a saturation voltage, the charge current of the cell is transmitted via the bypass branch so that an overload of the cell is avoided. The lifespan of each cell is thus increased.

Nevertheless, in such a battery, a defective cell continues to be passed through by the current delivered by the battery. This causes the defective cell to heat up and the efficiency of the battery as a whole to drop.

To avoid this drawback provoked by the presence of a defective cell within a battery, the use of a device as represented in FIG. 1 to neutralize a cell or a cell module that has become defective is known.

In FIG. 1, a battery 10 comprises n modules referenced $20a, \ldots, 20n$, connected in series to each other. Each module is itself made up of several electrochemical cells referenced $30a, \ldots, 30p$. The cells $30a, \ldots, 30p$ are connected in parallel to each other within each module. Each module $20a, \ldots, 20n$ of cells also comprises a charge limiting circuit 40. At the input of each module $20a, \ldots, 20n$, a switch 50 makes it possible to divert all the current that passes through the battery into a module bypass branch. Thus, when a cell of a given module becomes defective, the control of the corresponding switch makes it possible to neutralize this module, so that the battery current no longer passes through it. Such a battery arrangement comprises numerous electrical and electronic components which make it cumbersome, costly and heavy. These drawbacks are incompatible with many battery uses, including in particular the energy supply for a satellite.

One aim of the present invention is to overcome these drawbacks.

For this, according to the invention, a method of the type concerned is characterized in that it comprises the following steps:

(a) detecting a defective module;
(b) having a discharge current pass through the defective module so as to provoke an electrochemical reaction in the defective module, said reaction resulting in the formation of a short-circuit path between connection terminals of said defective module;
(c) using the battery by passing an electric current generated by the discharging of at least one module different from the defective module through said defective module.

With these arrangements, there is no need to provide a switch nor a bypass branch for each module, designed to be activated when a cell of the module becomes defective. The battery is therefore simpler, more lightweight and less costly. In practice, with the formation of the short-circuit path between the terminals of the module which includes the defective cell, this module is neutralized internally. The operation of the other modules of the battery is then not disturbed by the module which includes the defective cell.

In various embodiments of the inventive method, it is also possible to use one or several of the following arrangements:

the cells are of the lithium-ion type;
the discharge current provoking the reaction forming the short-circuit path is generated by the discharging of at least one module of the battery different from the defective module;
the discharge current provoking the reaction forming the short-circuit path is also used to power a device external to the battery;
a first partial discharge of the defective module is performed before step (b);
each module of electrochemical cells comprises a charge limiting circuit for said module, connected in parallel to said module, and the partial discharge current from the defective module passes through the charge limiting circuit of said defective module;
the partial discharge current from the defective module is controlled by variation of a reference signal for the charge limiting circuit;
the discharge current provoking the reaction forming the short-circuit path in the defective module generates a reversal of the defective module;
the short-circuit path comprises conductive dendrites formed in at least one cell of the defective module;
the conductive dendrites are metallic;
the number of cells per module is between 3 and 13; and
the number of modules in the battery is between 9 and 24.

The invention also proposes a rechargeable battery comprising at least two modules of electrochemical cells connected in series. The electrochemical cells are connected in parallel to each other within each module. Each module also comprises a charge limiting circuit for said module connected in parallel to said module, which comprises:

a bypass branch connected between an input terminal and an output terminal of the corresponding battery module;
a reference signal source;
a regulating device suitable for controlling a current in said bypass branch on the basis of a control signal received on a control terminal of the regulating device; and
at least one differential operator comprising an output terminal linked to the control terminal of the regulating device, a first input terminal connected to receive a signal representative of the voltage at the terminals of said module of the battery, and a second input terminal connected to receive said reference signal, the differential operator being suitable for generating the control signal according to a difference between the signals received on said first and second input terminals of the differential operator;

the battery being characterized in that the reference signal source of each battery module can be varied.

In various embodiments of the inventive battery, it is also possible to use one or several of the following arrangements:

the bypass branch comprises at least one resistive element;
the signal representative of the output voltage of each module is obtained by a voltage divider bridge connected in parallel to said module;
the battery comprises at least one radio receiver, the respective reference signal sources of the modules of electrochemical cells being linked to the radio receiver, and suitable for varying the corresponding reference signal according to a received radio control;
the differential operator of each charge limiting circuit comprises a feedback loop;

the feedback loop comprises a resistor and a capacitor connected in series;

the regulating device of the charge limiting circuit of each module comprises at least one transistor, said transistor having two main terminals connected to the bypass branch of said module;

the regulating device of each charge limiting circuit comprises at least two associated transistors in Darlington configuration;

the number of cells per module is between 3 and 13; and the number of modules per battery is between 9 and 24.

Moreover, another subject of the invention is a satellite that comprises at least one battery as described previously.

The satellite can also include a defective module detector and a radio transmitter arranged to transmit identification codes of a defective module in the battery.

The satellite can also include a radio receiver to which are linked the reference signal sources of the modules of cells, each reference signal source being suitable for varying the corresponding reference signal according to a received radio control.

Other features and advantages of the invention will become apparent from the following description of one embodiment, given by way of a nonlimiting example, in light of the appended drawings.

In the drawings:

FIG. 1, already described, represents a battery as known from the prior art;

Figure 1:
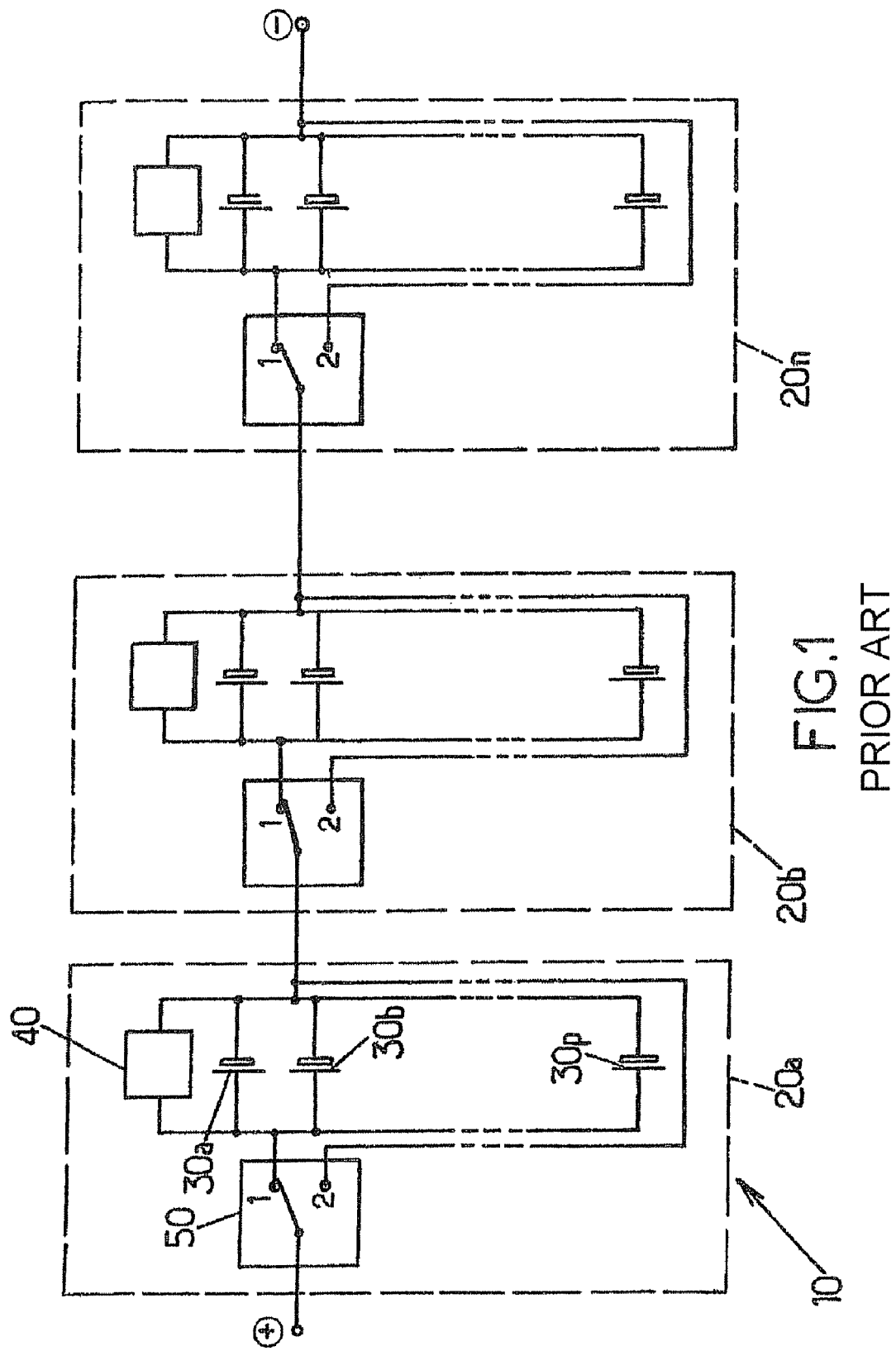
Figure 2:
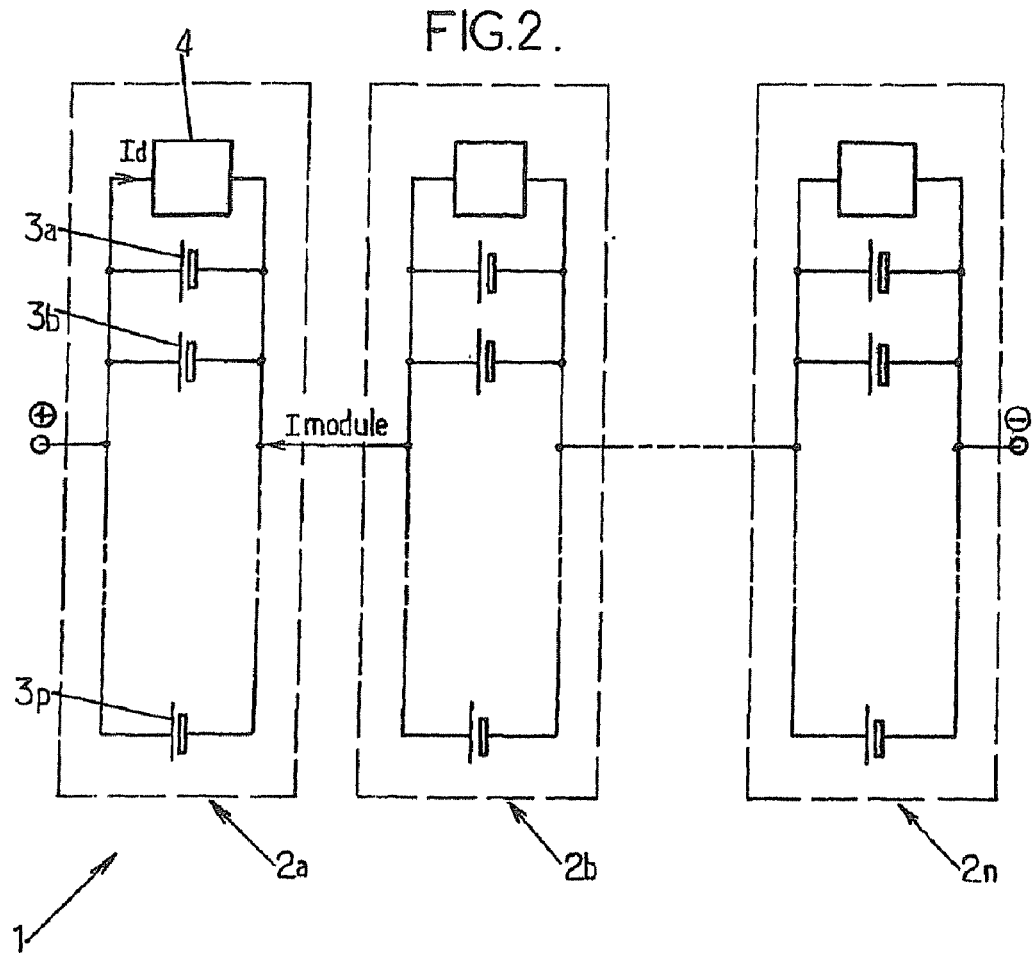
FIG. 2 represents a battery according to the invention.

In FIG. 2, a battery 1 comprises several modules $2a, \ldots, 2n$, connected in series to each other. Each module $2a, \ldots, 2n$ can itself comprise several cells $3a, \ldots, 3p$ connected in parallel to each other. The cells $3a, \ldots, 3p$ can be of the lithium-ion type.

Figure 4:
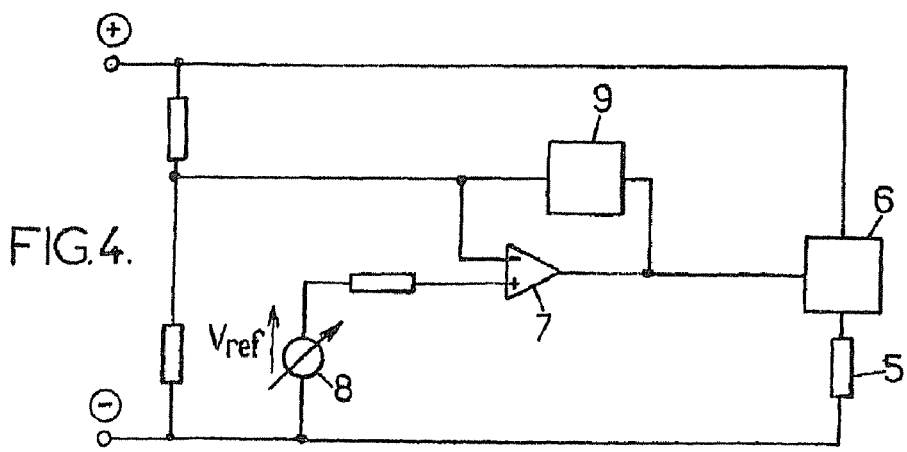
FIG. 4 is an electrical circuit diagram of a charge limiting circuit that can be used to implement the invention.

A charge limiting circuit 4 is connected to the terminals of each of the modules $2a, \ldots, 2n$. This makes it possible to avoid an overload of the module to which it is connected. With reference to FIG. 4, each charge limiting circuit 4 comprises a bypass branch, which comprises at least one resistor 5. A regulating device 6 controls the current in the resistor 5 based on a control signal delivered by a differential operator 7. This differential operator 7 comprises two input terminals and one output terminal. The first input terminal of the differential operator 7 is connected to a reference signal source 8, such as, for example, a voltage source. The second input terminal is connected to the intermediate point of a voltage divider bridge, itself connected in parallel between the terminals of the cell module. Thus, the second input terminal of the differential operator 7 receives a signal representative of the voltage at the terminals of the module, namely a predetermined fraction of the latter. The output terminal of the differential operator 7 is linked to the control input of the regulating device 6.

A feedback loop 9 links the second input terminal to the output terminal of the differential operator 7. This feedback loop 9 can be of the proportional integral loop type, which comprises a resistor connected in series with a capacitor. Such a feedback loop 9 provides the charge limiting circuit 4 with a particularly suitable response dynamic range. In particular, with such a feedback loop, the load current of the module is progressively tapped by the bypass branch, in a proportion that increases as the voltage between the terminals of the module approaches the saturation voltage.

The regulating device 6 can comprise transistors connected in a Darlington configuration. Such a cascaded transistor configuration provides an operating characteristic with progressive transition between a first state, in which no current passes through the bypass branch, and a second state, in which all the battery charge current is conducted by the bypass branch.

Furthermore, the Darlington configuration makes it possible to interlink two levels of the regulating device 6: a first level, called control level, comprising the differential operator 7, the reference signal source 8, the feedback loop 9 and the voltage divider bridge, and a second level, called power level, comprising the bypass branch.

The charge limiting circuit 4 has two functions. On the one hand, it prevents overloading of the electrochemical cells of the module. When the cells $3a, \ldots, 3p$ of the module are all charged, the voltage at the terminals of the module is equal to the saturation value. The voltage representative of the charge of the module is compared with the reference voltage supplied by the reference source 8. When it is greater than a predetermined threshold, for example 4V in the case of a lithium-ion battery, the differential operator 7 controls the regulating device 6 so that the charge current is tapped in the bypass branch. Thus, an overload of the cells of the module is avoided.

Also, the charge limiting circuit 4 makes it possible to provoke the formation of a short circuit in a module of the battery that has become defective. For this, a suitable detector identifies a defective module on the basis, for example, of the voltage, the pressure, the temperature and/or the current of each module of the battery. It transmits an identification of the defective module to a control station which, in return, produces a defective module neutralization control.

On receiving this control, the voltage source 8 reduces the reference voltage so as to partially discharge the defective module. The new reference voltage can be 3V, for example, in the case of a lithium-ion battery. The voltage at the terminals of the defective module is then greater than the reference voltage. The differential operator 7 then controls the switching of the regulating device, and the transistors of the bypass branch become conductive. The current that passes through the resistor 5 provokes the discharging of the cells of the defective module. This corresponds to phase 1 indicated in the graph of FIG. 3. During this discharge, the current Id in the charge limiting current can be roughly constant. The voltage at the terminals of the module drops according to the characteristic discharge curve of a battery. When the voltage at the terminals of the module reaches the value of the reduced reference voltage, it is possible, if necessary, to stop this discharge by increasing the voltage of the reference signal again. A waiting phase 2 is possible. During this phase 2, a next use of the battery by the satellite is awaited.

When this battery is used (phase 3) to power an external device, the current $I_{module}$ from the module increases. This discharge current can be roughly constant, according to the usage conditions of the latter. It passes through the battery, provoking an overdischarge of the electrochemical cells of the defective module. During this phase, the voltage at the terminals of the defective module can be reversed, that is, become negative. This is what is called the reversal effect. For a battery of the lithium-ion type, this reflects the formation of metallic dendrites in at least one of the cells of the defective module. The size of the dendrites increases as long as the overdischarge current is maintained, until a short-circuit path is formed between the electrodes of one of the cells of the defective module.

Figure 3:
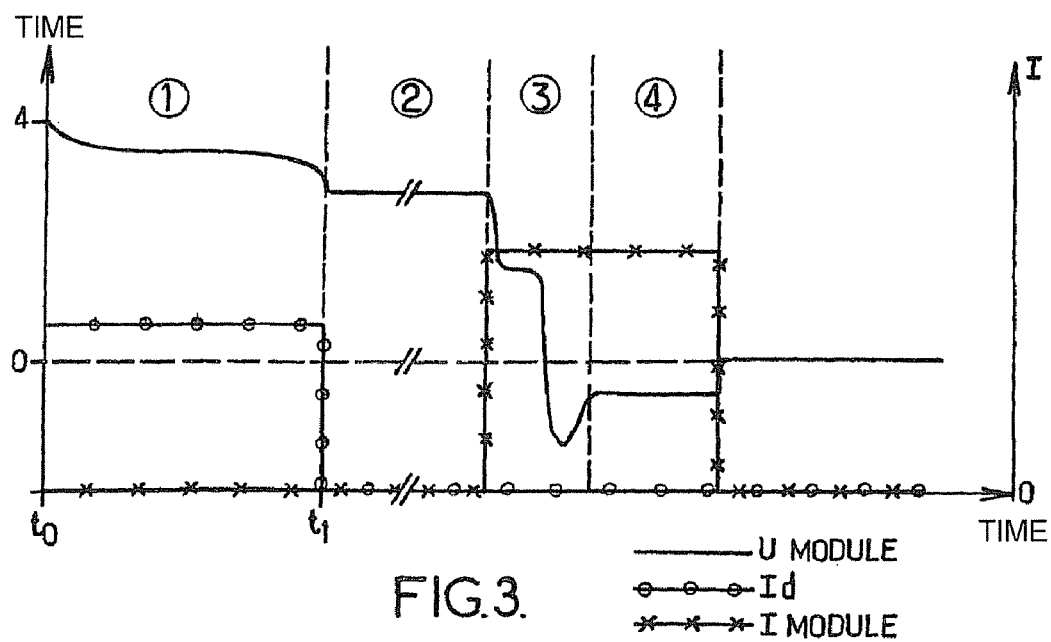
FIG. 3 is a diagram showing the trend of the voltage at the terminals of a battery module on implementing a battery management method according to the invention.

When the metallic dendrites form a bridge between the electrodes of an electrochemical cell, a short circuit appears (phase 4 of FIG. 3). The defective module, duly short-circuited, is equivalent to a conductor wire of low resistance, of the order of 10 mΩ, for example.

Such a battery is suitable for use on board a satellite. A satellite normally comprises a radio transceiver for communicating with a ground control station. This radio transceiver is arranged to send the identification of the defective module to the control station, which, as appropriate, returns a control to neutralize the defective module.

The number of modules that make up the battery is fixed by the power supply voltage of the device powered by the latter. Thus, normally, the battery consists of 9 to 24 modules.

Moreover, the number of electrochemical cells in each module depends on the intensity of the power supply current that has to be delivered. Furthermore, it is preferably not too high, given that the failure of a cell causes the entire module to be neutralized. Normally, the number of cells per module is between 3 and 13.

The invention claimed is:

1. A method of managing a rechargeable battery identified as having a defective module, the battery comprising at least two modules of electrochemical cells connected in series, said electrochemical cells being connected in parallel to each other within each said module and each said module of said electrochemical cells comprising a charge limiting circuit for said module connected in parallel to said module, the method comprising the following steps:
   (a) having a discharge current pass through the defective module so as to provoke an electrochemical reaction in the defective module, said reaction resulting in the formation of a short-circuit path between connection terminals of said defective module;
   (b) using the battery by passing an electric current, generated by the discharging of at least one said module different from the defective module, through said defective module;
   wherein a first partial discharge of the defective module is performed before the step (a), a partial discharge current of the defective module passing through the charge limiting circuit of said defective module, and being controlled by variation of a reference signal for the charge limiting circuit of said defective module.

2. The method as claimed in claim 1, wherein the cells are of the lithium-ion type.

3. The method as claimed in claim 1, wherein the discharge current provoking the reaction forming the short-circuit path is generated by the discharging of at least one module of the battery different from the defective module.

4. The method as claimed in claim 3, wherein the discharge current provoking the reaction forming the short circuit path is also used to power a device external to the battery.

5. The method as claimed in claim 4, wherein the discharge current provoking the reaction forming the short-circuit path in the defective module generates a reversal of the defective module.

6. The method as claimed in claim 5, wherein the short-circuit path comprises conductive dendrites formed in at least one cell (of the defective module.

7. The method as claimed in claim 6, wherein the conductive dendrites are metallic.

8. The method as claimed in claim 7, wherein the number of cells per module is between 3 and 13.

9. The method as claimed in claim 8, wherein the number of modules in the battery is between 9 and 24.

10. A rechargeable battery, comprising at least two modules of electrochemical cells connected in series, said electrochemical cells being connected in parallel to each other within each module, each module also comprising a charge limiting circuit for said module connected in parallel to said module, each charge limiting circuit comprising:
    a bypass branch connected between an input terminal and an output terminal of the corresponding battery module;
    a reference signal source;
    a regulating device suitable for controlling a current in said bypass branch on the basis of a control signal received on a control terminal of the regulating device; and
    at least one differential operator comprising an output terminal linked to the control terminal of the regulating device, a first input terminal connected to receive a signal representative of the voltage at the terminals of said module of the battery, and a second input terminal connected to receive said reference signal, the differential operator being suitable for generating the control signal according to a difference between the signals received on said first and second input terminals of the differential operator;
    and wherein the reference signal source of the charge limiting circuit of each module of the battery can be varied so as to partially discharge a defective module.

11. The battery as claimed in claim 10, wherein the bypass branch comprises at least one resistive element.

12. The battery of claim 10, wherein the signal representative of the output voltage of each module is obtained by a voltage divider bridge connected in parallel to said module.

13. The battery of claim 10, comprising at least one radio receiver, wherein the respective reference signal sources of the modules of electrochemical cells are linked to the radio receiver, and are suitable for varying the corresponding reference signal according to a received radio control.

14. The battery of claim 10, wherein the differential operator of each charge limiting circuit comprises a feedback loop.

15. The battery as claimed in claim 14, wherein the feedback loop comprises a resistor and a capacitor connected in series.

16. The battery of claim 10, wherein the regulating device of the charge limiting circuit of each module comprises at least one transistor, said transistor having two main terminals connected to the bypass branch of said module.

17. The battery as claimed in claim 16, wherein the regulating device of each charge limiting circuit comprises at least two associated transistors in Darlington configuration.

18. The battery of claim 10, wherein the number of cells per module is between 3 and 13.

19. The battery of claim 10, wherein the number of modules per battery is between 9 and 24.

20. A satellite comprising at least one battery of claim 10.

21. The satellite as claimed in claim 20, also comprising a defective module detector and a radio transmitter arranged to transmit identification codes of a defective module in the battery.

22. The satellite of claim 20, also comprising a radio receiver, wherein the respective reference signal sources of the modules of electrochemical cells are linked to the radio receiver, and are each suitable for varying the corresponding reference signal according to a received radio control.

* * * * *